United States Patent
Blatchley, III

(10) Patent No.: US 11,084,738 B2
(45) Date of Patent: Aug. 10, 2021

(54) METHODS AND SYSTEMS FOR SEPARATION OF CHLORAMINES IN AQUEOUS SOLUTIONS

(71) Applicant: Purdue Research Foundation, West Lafayette, IN (US)

(72) Inventor: Ernest R. Blatchley, III, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 67 days.

(21) Appl. No.: 16/587,255

(22) Filed: Sep. 30, 2019

(65) Prior Publication Data

US 2020/0198994 A1    Jun. 25, 2020

Related U.S. Application Data

(60) Provisional application No. 62/738,322, filed on Sep. 28, 2018.

(51) Int. Cl.
*C02F 1/44* (2006.01)
*C02F 1/50* (2006.01)
(Continued)

(52) U.S. Cl.
CPC ............ *C02F 1/448* (2013.01); *B01D 61/362* (2013.01); *B01D 69/02* (2013.01); *B01D 71/36* (2013.01);
(Continued)

(58) Field of Classification Search
CPC ........ C02F 1/448; C02F 1/50; C02F 2103/42; B01D 61/362; B01D 69/02; B01D 71/36;
(Continued)

(56) References Cited

U.S. PATENT DOCUMENTS

2014/0295568 A1* 10/2014 Evtodienko ............ G01N 31/22
436/125

FOREIGN PATENT DOCUMENTS

JP           2994611 B2 * 12/1999

OTHER PUBLICATIONS

Pinkernell, U. et al., "Methods for the Photometric Determination of Reactive Bromine and Chlorine Species with Abts", Wat. Res. (2000) vol. 34, No. 18, pp. 4343-4350.
(Continued)

*Primary Examiner* — Ryan B Huang
(74) *Attorney, Agent, or Firm* — Hartman Global IP Law; Gary M. Hartman; Domenica N. S. Hartman

(57) ABSTRACT

Systems and methods for separating organic chloramines and inorganic chloramines from an aqueous solution. Such a method includes providing a first container containing an aqueous solution that includes organic and inorganic chloramines and free chlorine, providing a second container containing a trapping solution and a tubular hydrophobic membrane through which inorganic chloramines contained in the aqueous solution can diffuse into the trapping solution, pumping the aqueous solution from the first container through the tubular hydrophobic membrane of the second container; and collecting the aqueous solution pumped through the tubular hydrophobic membrane in a third container connected to the tubular hydrophobic membrane. After pumping is completed, the second container contains an aqueous solution containing the inorganic chloramines and the third container contains an aqueous solution containing the organic chloramines and the free chlorine.

20 Claims, 2 Drawing Sheets

(51) Int. Cl.
  *B01D 61/36*  (2006.01)
  *B01D 69/02*  (2006.01)
  *B01D 71/36*  (2006.01)
  *C02F 103/02*  (2006.01)
  *C02F 101/38*  (2006.01)
  *C02F 103/42*  (2006.01)

(52) U.S. Cl.
  CPC ............ *C02F 1/50* (2013.01); *B01D 2325/38* (2013.01); *C02F 2101/38* (2013.01); *C02F 2103/023* (2013.01); *C02F 2103/42* (2013.01); *C02F 2303/04* (2013.01)

(58) Field of Classification Search
  CPC .... B01D 2325/38; B01D 61/18; B01D 61/28; B01D 61/366
  See application file for complete search history.

(56) References Cited

OTHER PUBLICATIONS

Shang, C. et al., "Differentiation and Quantification of Free Chlorine and Inorganic Chloramines in Aqueous Solution by MIMS", Environ. Sci. Technol. (1999), vol. 33, pp. 2218-2223.

Weng, S.-C. et al., "Dynamics of Gas-Phase Trichloramine (NCl3) in Chlorinated, Indoor Swimming Pool Facilities", Indoor Air (2011); vol. 21, pp. 391-399.

Weng, S.-C. et al., "Dynamics of Gas-Phase Trichloramine (NCl3) in Chlorinated, Indoor Swimming Pool Facilities", Supporting Information, pp. (9).

\* cited by examiner

METHODS AND SYSTEMS FOR SEPARATION OF CHLORAMINES IN AQUEOUS SOLUTIONS

CROSS-REFERENCE TO RELATED APPLICATIONS

This application claims the benefit of U.S. Provisional Application Ser. No. 62/738,322, filed Sep. 28, 2018, the contents of which are incorporated herein by reference.

BACKGROUND OF THE INVENTION

The present disclosure generally relates to separating chloramines contained in an aqueous solution into volatile and non-volatile chloramines.

This section introduces aspects that may help facilitate a better understanding of the disclosure. Accordingly, these statements are to be read in this light and are not to be understood as admissions about what is or is not prior art.

Swimming in pools represents a common form of exercise and recreation across most sectors of the population. For these facilities, disinfection of pool water is necessary as a means of reducing risk of disease transmission among swimmers. Chlorination is the most common form of disinfection for these applications. Chlorine is known to be generally effective as a disinfectant against most bacteria and viruses; however, it is minimally effective for control of some protozoan parasites, including *Cryptosporidium parvum*. Like all chemical disinfection processes, chlorination also results in the formation of disinfection byproducts (DBPs). Many of the DBPs that form in pools are attributable to reactions between free chlorine and organic-N compounds. These compounds are relevant in part because many of them express adverse human health effects. Also, swimmers introduce a large number of organic-N precursors through release of human body fluids (e.g., sweat and urine) while swimming.

Chloramines are of particular interest in swimming pool settings, where they are generally viewed as nuisance compounds or worse. Chloramines are formed as a result of reactions between free chlorine and ammonia or amine compounds. Free chlorine will participate in reactions in which +1-valent chlorine will be readily substituted for hydrogen onto the ammonia molecule, amine groups, or previously chlorine-substituted forms of these molecules. Chloramine compounds (sometimes referred to as "combined chlorine") include +1-valent chlorine, and are substantially less effective than free chlorine as disinfectants. They represent irritants for human tissues, including the eyes, the skin (in some people), and the respiratory system. They have been associated with asthma and other respiratory problems, though some debate exists in the scientific community as to the nature of this association.

Chloramines can be further divided into inorganic and organic forms. The inorganic chloramines include monochloramine ($NH_2Cl$), dichloramine ($NHCl_2$), and trichloramine ($NCl_3$). A wide range of organic-N compounds have been identified as precursors for formation of inorganic chloramines in pools, including urea, creatinine, uric acid, and amino acids. Inorganic chloramines can also be formed from chlorination of ammonia, but this pathway generally represents a minor contributor to formation of inorganic chloramines in pools because the ammonia concentration in human body fluids, and in pools, tends to be quite low. Regardless of their origin, the presence of any of the inorganic chloramines generally implies the presence of the other two compounds, largely because of the equilibria that exist among these compounds Organic chloramine compounds that form in pools often involve chemical mechanisms that are similar to those that are responsible for formation of inorganic chloramines. However, much less is known about the mechanisms and kinetics of their formation and decomposition than with the inorganic chloramines. Organic chloramine compounds generally express no germicidal activity and are often more toxic than their parent compounds or their inorganic analogs. In addition, these compounds participate in reactions that lead to the formation of other DBPs in pools and are also sources of chlorine demand.

Organic and inorganic chloramines are variable in terms of their physico/chemical properties. An important example is their volatility. Table 1 below provides a summary of reported Henry's law constants (20° C.) and typical liquid-phase concentrations for chloramine compounds and other forms of residual chlorine that are known to be common in pools.

TABLE 1

| Compound | Henry's law constant (atm) | Typical liquid-phase concentration (mg/L as $Cl_2$) |
|---|---|---|
| $Cl_2$ | 767 | $10^{-5}$ |
| $NCl_3$ | 435 | 0.001–0.2 |
| $CH_3NCl_2$ | 154 | 0.002–0.05 |
| $NHCl_2$ | 1.52 | 0.01–0.3 |
| $NH_2Cl$ | 0.45 | 0.05–1.0 |
| HOCl | 0.060 | 1–5* |
| OCl- | 0 | |

The National Swimming Pool Foundation (NSPF) currently recommends that free chlorine be maintained between 1-5 mg/L (as $Cl_2$) in chlorinated pools. The distribution of free chlorine between HOCl and OCl$^-$ will be governed by pH. Strictly speaking, molecular chlorine ($Cl_2$) will also contribute to free chlorine; however, its concentration will be orders of magnitude lower than HOCl and OCl$^-$ in swimming pools. When combined with their respective typical liquid-phase concentrations, the values reported in Table 1 indicate that $NCl_3$ is likely to express the greatest potential for transfer to the gas phase, although $CH_3NCl_2$ may also contribute significantly to this signal. In general, $NCl_3$ and $CH_3NCl_2$ are largely responsible for the "chlorine odor" that characterizes chlorinated indoor pools, though $NCl_3$ is usually present at higher concentration than $CH_3NCl_2$ in pools. Conversely, free chlorine and most organic chloramines have minimal or no (measurable) potential to transfer from the liquid to the gas phase and are minor contributors to the chlorine odor in pools. For this reason, in this disclosure, the phrases "organic chloramines" and "non-volatile chloramines" are used interchangeably. Likewise, "inorganic chloramines" and "volatile chloramines" are used interchangeably in this disclosure.

A wide range of analytical methods exists for quantification of chloramine compounds in water. Common wet-chemical methods, such as those based on N,N Diethyl-1,4 phenylenediamine (DPD, sometimes augmented by potassium iodide, KI), were designed for quantification of free chlorine (formally defined as the sum of the molar concentrations of $Cl_2$, HOCl, and OCl$^-$) and the inorganic chloramines. When applied for this purpose, DPD-based methods tend to be selective for free chlorine, while the combined chlorine signal is known to be susceptible to interference from a number of compounds, notably including many organic chloramines. DPD-based wet chemical methods depend on formation of a Würster dye, a bright pink compound, for quantification of the target compounds. However, the organic chloramines (and other compounds, including $O_2$) are also known to react with DPD to yield a Würster dye, thereby representing sources of interference in the conventional application of these methods. Another source of interference in this method is the oxidation of a Würster dye to yield a colorless, imide compound. This "bleaching" of the characteristic pink color of a Würster dye can complicate the interpretation of measurements by the DPD method.

A number of other wet-chemical methods exist for detection and quantification of free and combined chlorine, including (2,2-azino-bis(3-ethylbenzothiazoline)-6-sulfonic acid-diammonium salt (ABTS). ABTS reacts with these compounds to yield a green-colored product, which can be quantified spectrophotometrically. These simple wet-chemical methods have important benefits of simplicity and low cost, but can present problems in terms of differentiation among inorganic and organic chloramine compounds. In swimming pool applications, this lack of discrimination can yield incorrect or misleading information about the chemistry of a pool's water, and by extension the treatment approaches that should be applied to remediate pool water chemistry problems.

Membrane Introduction Mass Spectrometry (MIMS) has been demonstrated to be effective for quantification and identification or chloramine compounds in water samples. MIMS has been applied for characterization of pool water samples. In the configurations of MIMS that have been used for this purpose, an aqueous sample is pumped through a tubular, hydrophobic membrane. An example of such a MIMS system is illustrated in FIG. 1, which depicts a hydrophobic membrane 10 through which an aqueous sample is pumped. The membrane 10 is enclosed in a housing 12 through which an inert gas can be flowed between a gas inlet 14 and a gas outlet 16. The sample is supplied to the membrane 10 through a tube 18. Water and polar (or ionic) compounds contained in the sample are rejected by the membrane 10, but volatile compounds are able to diffuse (pervaporate) through the membrane 10 into the surrounding cavity of the housing 12. After doing so, these compounds are swept into a mass spectrometer (not shown) by the inert gas where they can be identified and quantified by their respective mass spectrometric signals. Because detection is by mass spectrometry, MIMS is generally less susceptible to interference than are the wet-chemical methods described above. As such, it may be viewed as a benchmark method for analysis of chloramine compounds in water samples. However, currently-available MIMS-based methods are not sufficiently affordable or simple to be used as a tool for routine (i.e., pool-side) measurements of pool water chemistry.

The wet-chemical methods and MIMS are based on fundamentally different methods of detection and separation. As such, they provide substantially different measures of water quality. Therefore, interpretation of measurements by these two methods should involve consideration of the basic characteristics of each method. In general terms, important advantages and disadvantages of these methods can be identified. For example, the wet-chemical methods are rapid, simple, and inexpensive to apply, and their common use has helped to facilitate interpretation of results of measurements by these methods. However, the wet-chemical methods are known to be susceptible to interference from compounds that occur commonly at substantial concentrations in pools and generally provide limited information about speciation of residual chlorine compounds. MIMS relies on gas/liquid separation and mass spectrometry to yield a method that can rapidly and (essentially) unambiguously differentiate among the chloramine compounds that are common in pools, while also yielding detection limits that are lower than their wet-chemical analogs. However, the cost and complexity of MIMS prevents its application in settings outside of research.

Thus there is an unmet need for methods and systems tools that can provide accurate, reliable measurements of chloramine composition in pool water (and other settings), while retaining the attributes of speed, simplicity, and low cost. Further it is desirable to have wet-chemistry methods for differentiation and quantification of organic and inorganic chloramines in water samples.

BRIEF SUMMARY OF THE INVENTION

The present invention provides systems and methods suitable for separating organic chloramines and inorganic chloramines from an aqueous solution.

According to one aspect of the invention, such a system includes a first container containing an aqueous solution that includes organic and inorganic chloramines and free chlorine, a second container containing a trapping solution and a tubular hydrophobic membrane through which inorganic chloramines contained in the aqueous solution can diffuse into the trapping solution, a pump capable of pumping the aqueous solution from the first container through the tubular hydrophobic membrane of the second container, and a third container connected to the tubular hydrophobic membrane such that the third container is capable of collecting the aqueous solution pumped through the tubular hydrophobic membrane. After pumping is completed, the second container contains an aqueous solution containing reaction products of the inorganic chloramines with the trapping solution and the third container contains an aqueous solution containing the organic chloramines and the free chlorine.

According to another aspect of the invention, a method of separating organic chloramines and inorganic chloramines from an aqueous solution includes providing a first container containing an aqueous solution that includes organic and inorganic chloramines and free chlorine, providing a second container containing a trapping solution and a tubular hydrophobic membrane through which inorganic chloramines contained in the aqueous solution can diffuse into the trapping solution, pumping the aqueous solution from the first container through the tubular hydrophobic membrane of the second container; and collecting the aqueous solution pumped through the tubular hydrophobic membrane in a third container connected to the tubular hydrophobic membrane. After pumping is completed, the second container contains an aqueous solution containing the inorganic chloramines and the third container contains an aqueous solution containing the organic chloramines and the free chlorine.

Other aspects and advantages of this invention will be appreciated from the following detailed description.

DETAILED DESCRIPTION OF THE INVENTION

Figure 1:
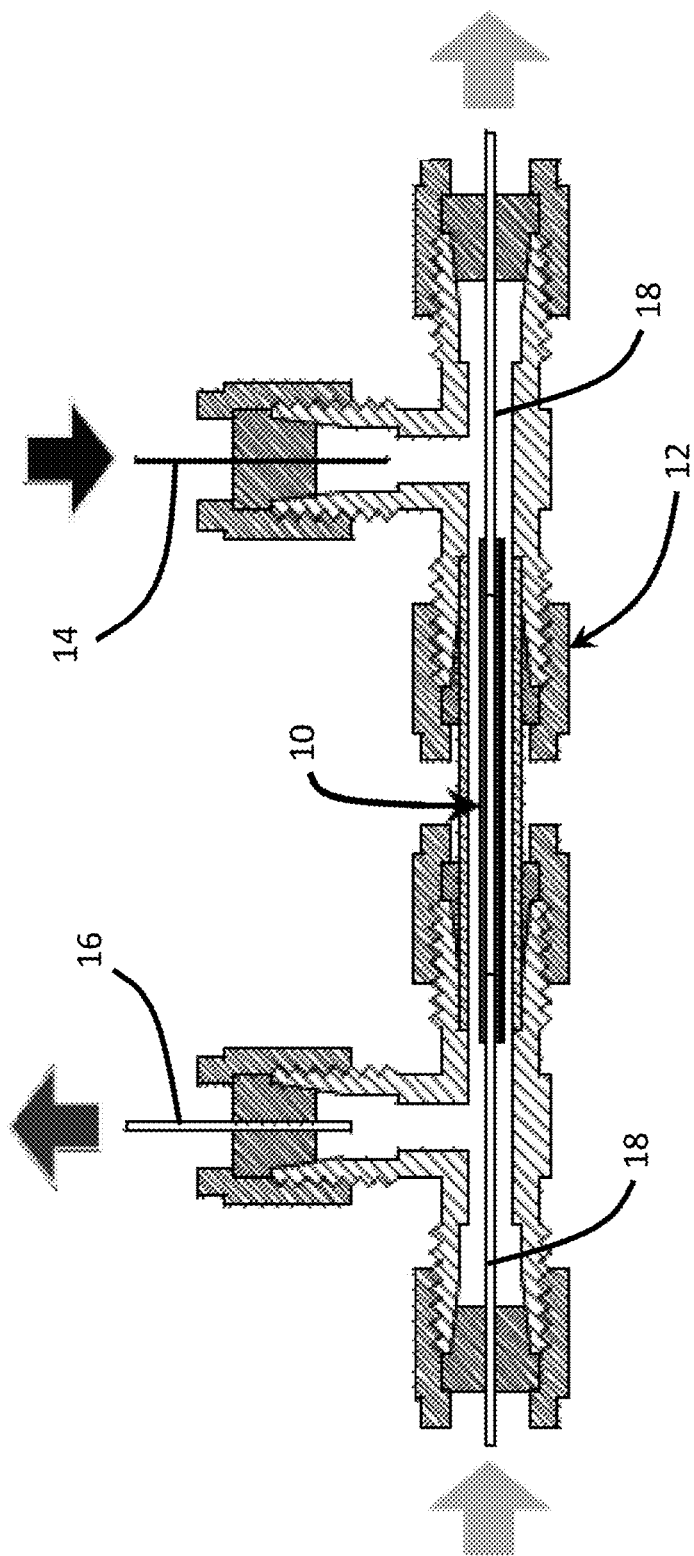
FIG. 1 is a schematic illustration of a membrane introduction mass spectrometry (MIMS) system suitable for quantification and identification of chloramine compounds in water samples.

For the purposes of promoting an understanding of the principles of the present disclosure, reference will now be made to embodiments illustrated in the drawings, and specific language will be used to describe the same. It will nevertheless be understood that no limitation of the scope of this disclosure is thereby intended.

Poolside test methods and systems are disclosed that are capable of separate measurements of organic and inorganic chloramines in aqueous solutions, including but not limited to water in swimming pools, water in public water supplies, water used in cooling towers, and other bodies of water in which chlorine may be used as a means of disinfection or chemical oxidation to reduce the risk of disease transmission among users. The methods and systems described in this disclosure can allow for improved operation and maintenance of such aqueous solutions. In cases in which the aqueous solution is a swimming pool or similar body of water used by bathers, data that can be generated by implementation of these methods and systems are capable of use to improve operating guidelines for swimming pools, as described by the Model Aquatic Health Code (MAHC). The methods and systems utilize an approach that integrates a hydrophobic membrane with a wet-chemical method to allow quantification of compounds that include +1-valent chlorine.

As mentioned previously, it should be noted that typically organic chloramines are (for the most part) non-volatile, while inorganic chloramines are volatile. For this reason, in this disclosure, the phrases "organic chloramines" and "non-volatile chloramines" are used interchangeably and "inorganic chloramines" and "volatile chloramines" are used interchangeably in this disclosure.

Figure 2:
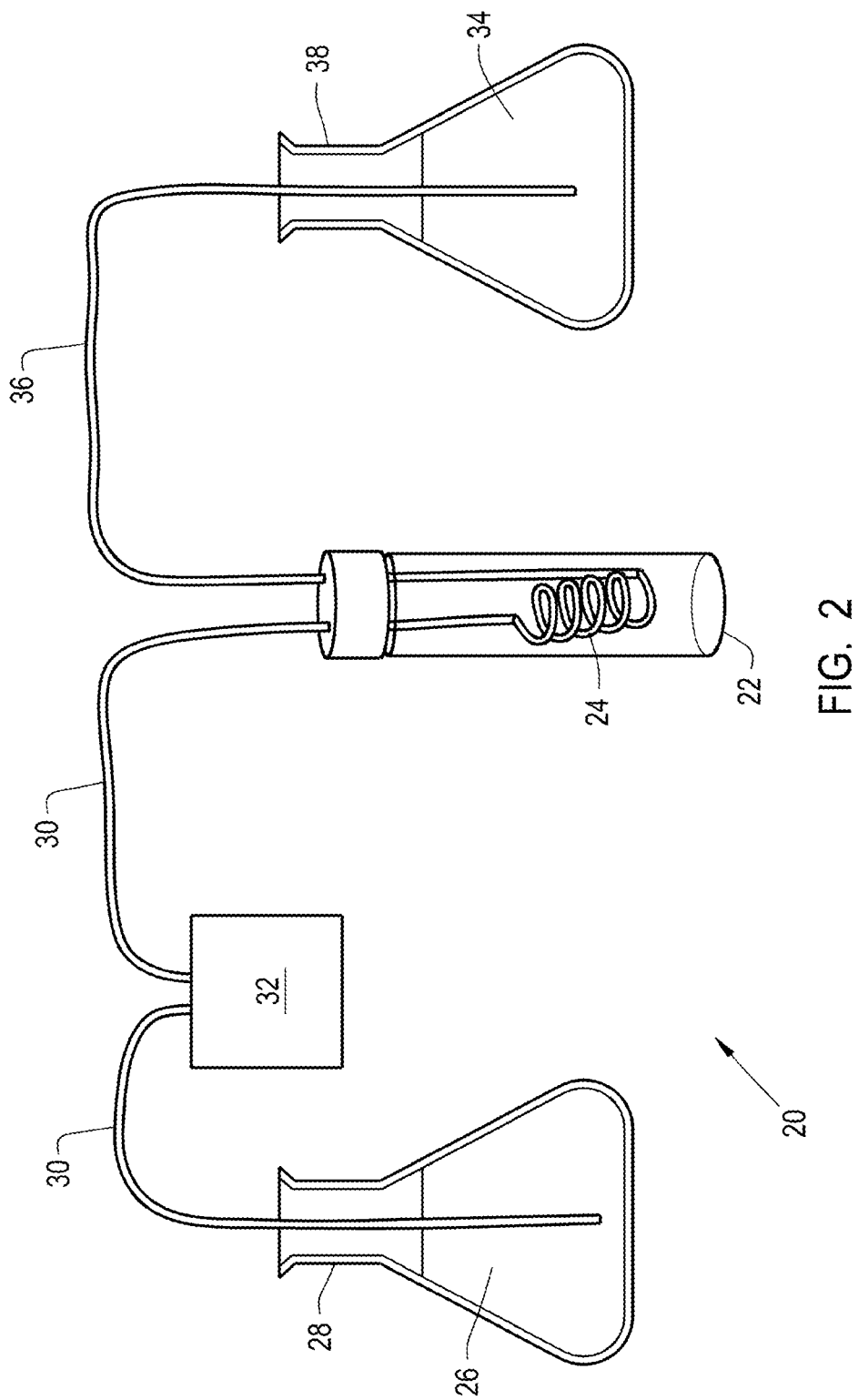
FIG. 2 shows a representation of a system for the separation of $NCl_3$ and free chlorine from an aqueous solution in accordance with a nonlimiting embodiment of the invention.

FIG. 2 shows a representation of a system 20 that was constructed for use in experiments leading to this disclosure to evaluate the separation of $NCl_3$ and free chlorine from aqueous solutions. FIG. 2 depicts the system 20 as including a glass vial 22 containing a semipermeable hydrophobic tubing 24 utilized as a pervaporation membrane, such as of the type represented in FIG. 1. For the experiment, the vial 12 had a capacity of about 30 mL and the tubing 24 was a silicone tube, though it is foreseeable that other hydrophobic materials that are permeable to volatile chloramines could be used. Additionally, the tubing 24 had a length of about 30 cm, though shorter and longer lengths are foreseeable. The vial 12 containing the tubing 24 was filled with an aqueous N,N Diethyl-1,4 phenylenediamine and potassium iodide (DPD/KI) solution (not shown) in which the tubing 24 was submerged. The DPD/KI solution served as a trapping solution to allow trapping and detection of +1-valent chlorine compounds that passed into the solution from the tubing 24. A sample aqueous solution 26 containing free chlorine and $NCl_3$ was pumped from a flask 28 and delivered to the submerged tubing 24 through a nonpermeable tube 30. Flow of the sample solution 26 was controlled by a pump 32 to a rate of about 1.0 mL/min for a period of 50 minutes. After exiting the vial 12, a residual portion 34 of the sample solution 26 passed through a second nonpermeable tube 36 before being collected in a second flask 38. Because $NCl_3$ is quite volatile (i.e., it has a relatively high Henry's law constant), there is a large driving force for its transfer across the tubing 24 serving as the pervaporation membrane. On the other hand, free chlorine (predominantly HOCl and $OCl^-$) is essentially non-volatile, and as such it would not be expected to transfer through the tubing 24 and instead remain entrained in the residual portion 34 that collects in the second flask 38.

The results of an experiment performed with the system 20 of FIG. 2 were that the DPD/KI trapping solution within the vial 22 turned bright pink (evidencing the forming of a Würster dye) as a result of diffusion of $NCl_3$ into the solution through the tubing 24. As such, $NCl_3$ was largely separated from the original sample solution 26 as a result of passing through the hydrophobic tubing 24, and therefore was largely absent in the residual portion 34 that collected in the second flask 38. Table 2 provides a summary of the concentrations of free and combined chlorine in the flasks 28 and 38 at the beginning and end of this experiment. Chlorine concentrations in Table 2 are expressed in units of mg/L, as $Cl_2$. Measurements of residual chlorine in the flask 38 are reported as not applicable (n/a) for t=0 because the flask 38 was empty at the beginning of the experiment.

TABLE 2

| Time (min) | Flask 28 | | Flask 38 | |
| --- | --- | --- | --- | --- |
| | $NCl_3$ | Free | $NCl_3$ | Free |
| 0 | 0.44 | 2.6 | n/a | n/a |
| 50 | 0.41 | 2.2 | 0.03 | 2.1 |

Collectively, the following conclusions were drawn from the results of the experiment described above and the data presented in Table 2. $NCl_3$ was transferred from the sample solution 26 in the flask 28 to the DPD/KI trapping solution in the vial 22. Free chlorine underwent minimal transfer from the sample solution 26 to the trapping solution when pumped through the vial 22. KI was added in stoichiometric excess of DPD.

Based on the above investigation, it was concluded that the system 20 represented in FIG. 2 was effect to separate organic chloramines and inorganic chloramines from an aqueous solution. Principles of basic physics indicate that forms of residual chlorine that are non-volatile or only slightly volatile will not be transferred from the sample solution 26 to the trapping solution. Since most organic chloramines are non-volatile (an exception is $CH_3NCl_2$), the process performed by the system 20 allow for discrimination of organic and inorganic chloramines.

Existing wet-chemical methods are known to yield signals in response to organic and inorganic chloramines that cannot be differentiated. The investigation described above demonstrated that the inclusion of a hydrophobic membrane can reduce or eliminate this interference by excluding most organic chloramine compounds from the trapping solution. The investigation further demonstrated that integrating a hydrophobic membrane with a wet-chemical technique enables the quantification of compounds that include +1-valent chlorine, and is effective for separation of volatile (largely inorganic) and non-volatile (largely organic) forms of these compounds. The method also integrates important strengths of existing analytical methods for detection and quantification of chloramine compounds, and can allow for differentiation and quantification of most compounds that comprise organic and inorganic chloramine compounds in pools.

Though the tubing 24 used in the investigation was formed of silicone, other hydrophobic membrane materials could be used, a non-limiting example of which is a polytetrafluoroethylene material commercially available under the name Gore-Tex®. Furthermore, though the trapping solution used was DPD/KI, other solutions could be used for this purpose, a non-limiting example of which is 2,2-azino-bis(3-ethylbenzothiazoline)-6-sulfonic acid-diammonium salt (ABTS).

Those skilled in the art will recognize several variations for the methods and systems. For example, the dimensions of the hydrophobic membrane tubing 22 can be tailored for optimum efficiency. The geometry of the tubing 22 can be varied, keeping in mind the requirement that the aqueous solution should be brought into contact with the tubing 22. The method of introduction of the aqueous liquid to the tubing 22 can be varied to suit requirements of speed and efficiency of the membrane material of the tubing 22.

A variable to further consider is the wet chemical method to be applied as a trapping agent and for quantification of +1-valent chlorine compounds. Common colorimetric agents, such as DPD/KI and ABTS, are reagent groups that differ in their ability to serve as trapping agents and yield a colorimetric signal when exposed to the target chemicals. They also differ in terms of their susceptibility to interference.

Another aspect of this disclosure is the method of sample introduction into the system 20. At one extreme is static sample introduction, in which a sample is brought into contact with the membrane material of the tubing 22 by injection, followed by a period of time in which the liquid sample remains static and volatile constituents are allowed to diffuse through the tubing 22. This represents the simplest method of sample introduction; however, it is also likely to yield relatively slow transfer of volatile compounds across the membrane of the tubing 22 because of the lack of an advective transport mechanism (i.e., transport by diffusion only). Another method of sample introduction involves continuous pumping. This increases mechanical complexity of the method, but increases the speed of analyte transfer, thereby reducing analysis time.

The method described above is applicable to several aquatic matrices. Solutions that can be employed in this method can include free chlorine (variable composition, as influenced by pH and chloride ion concentration), aqueous solutions of inorganic chloramines, and solutions containing individual organic chloramine compounds.

Another option can be mechanical mixing of the trapping solution. Mixing of the trapping solution may improve mass transport and development of a uniform colorimetric signal in the trapping solution, as it will result in reduction or elimination of concentration gradients within the trapping solution.

In any application of methods as described above, the mass of volatile analyte transferred across the tubing 22 will increase monotonically with time. For example, in static samples, the driving force for transport will diminish with time as the concentration of volatile analytes in the immediate vicinity of the tubing-water interface will decrease on the sample side and increase on the trapping solution side; these two attributes will diminish the overall driving force for transport, which in turn will reduce the rate of diffusive transport through the tubing 22. Pumped samples can exhibit similar behavior, but despite the fact that fluid motion through the tubing 22 will be in the laminar regime, diffusive transport rates can decrease with time because of changes in concentration gradients in the boundary layers that will develop on either side of the tubing 22.

In view of the above, while the invention has been described in terms of particular embodiments and investigations, it should be apparent that alternatives could be adopted by one skilled in the art. For example, process parameters could be modified and appropriate materials could be substituted for those noted. As such, it should be understood that the above detailed description is intended to describe the particular embodiments represented in the drawings and certain but not necessarily all features and aspects thereof, and to identify certain but not necessarily all alternatives to the represented embodiments and described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings, and the phraseology and terminology employed above are for the purpose of describing the illustrated embodiments and investigations and do not necessarily serve as limitations to the scope of the invention. Therefore, the scope of the invention is to be limited only by the following claims.

The invention claimed is:

1. A system for separating organic chloramines and inorganic chloramines from an aqueous solution, the system comprising:
   a first container containing an aqueous solution that includes organic and inorganic chloramines and free chlorine;
   a second container containing a trapping solution and a tubular hydrophobic membrane through which inorganic chloramines contained in the aqueous solution can diffuse into the trapping solution;
   a pump capable of pumping the aqueous solution from the first container through the tubular hydrophobic membrane of the second container; and
   a third container connected to the tubular hydrophobic membrane such that the third container is capable of collecting the aqueous solution pumped through the tubular hydrophobic membrane;
   wherein, when pumping is completed, the second container contains an aqueous solution containing a reaction product of the inorganic chloramines with the trapping solution and the third container contains an aqueous solution containing the organic chloramines and the free chlorine.

2. The system of claim 1, wherein the tubular hydrophobic membrane is made of silicone.

3. The system of claim 1, wherein the tubular hydrophobic membrane is made of polytetrafluoroethylene.

4. The system of claim 1, wherein the trapping solution contains N,N Diethyl-1,4 phenylenediamine (DPD) and potassium iodide.

5. The system of claim 1, wherein the trapping solution contains 2,2-azino-bis(3-ethylbenzothiazoline)-6-sulfonic acid-diammonium salt (ABTS).

6. The system of claim 1, wherein the reaction products include a Würster dye.

7. The system of claim 1, wherein the aqueous solution is water containing chlorine as a disinfectant.

8. The system of claim 7, wherein the aqueous solution is swimming pool water.

9. A method of separating organic chloramines and inorganic chloramines from an aqueous solution, the method comprising:

providing a first container containing an aqueous solution that includes organic and inorganic chloramines and free chlorine;

providing a second container containing a trapping solution and a tubular hydrophobic membrane through which inorganic chloramines contained in the aqueous solution can diffuse into the trapping solution;

pumping the aqueous solution from the first container through the tubular hydrophobic membrane of the second container; and collecting the aqueous solution pumped through the tubular hydrophobic membrane in a third container connected to the tubular hydrophobic membrane, such that, after pumping is completed, the second container contains a reaction product of the inorganic chloramines with the trapping solution and the third container contains an aqueous solution containing the organic chloramines and the free chlorine.

10. The method of claim 9, wherein the tubular hydrophobic membrane is made of silicone.

11. The method of claim 9, wherein the tubular hydrophobic membrane is made of polytetrafluoroethylene.

12. The method of claim 9, wherein the trapping solution contains N,N Diethyl-1,4 phenylenediamine (DPD) and potassium iodide.

13. The method of claim 9, wherein the trapping solution contains 2,2-azino-bis(3-ethylbenzothiazoline)-6-sulfonic acid-diammonium salt (ABTS).

14. The method of claim 9, wherein the reaction products include a Würster dye.

15. The method of claim 9, wherein the aqueous solution is water containing chlorine as a disinfectant.

16. The method of claim 15, wherein the aqueous solution is water in a swimming pool.

17. The method of claim 15, wherein the aqueous solution is water in a public water supply or water for use in a cooling tower.

18. A method of separating organic chloramines and inorganic chloramines from an aqueous solution, the method comprising:

providing a first container containing an aqueous solution that includes organic and inorganic chloramines and free chlorine;

providing a second container containing a DPD/KI trapping solution and a tubular hydrophobic membrane through which volatile forms of +1-valent chlorine contained in the aqueous solution can diffuse into the trapping solution;

pumping the aqueous solution from the first container through the tubular hydrophobic membrane of the second container; and collecting the aqueous solution pumped through the tubular hydrophobic membrane in a third container connected to the tubular hydrophobic membrane, wherein after pumping is completed, the second container contains an aqueous solution containing reaction products of volatile forms of +1-valent chlorine and the DPD/KI trapping solution and the third container contains an aqueous solution containing non-volatile forms of +1-valent chlorine.

19. The method of claim 18, wherein the aqueous solution is water in a swimming pool.

20. The method of claim 18, wherein the aqueous solution is water in a public water supply or water for use in a cooling tower.

* * * * *